United States Patent [19]

Nishimoto et al.

[11] Patent Number: 5,001,931

[45] Date of Patent: Mar. 26, 1991

[54] METHOD AND APPARATUS FOR PREDICTING DESTRUCTION OF A ROLLING BEARING

[75] Inventors: Shigeto Nishimoto; Tomoyuki Saegusa; Yoshiki Fujimoto, all of Osaka, Japan

[73] Assignee: Koyo Seiko Co., Ltd., Osaka, Japan

[21] Appl. No.: 529,519

[22] Filed: May 29, 1990

Related U.S. Application Data

[63] Continuation-in-part of Ser. No. 323,787, Mar. 15, 1989, abandoned, which is a continuation-in-part of Ser. No. 184,615, Apr. 21, 1988, abandoned.

[30] Foreign Application Priority Data

Apr. 28, 1987 [JP] Japan ................... 62-107113

[51] Int. Cl.$^5$ ........................................ G01M 13/04
[52] U.S. Cl. ........................................ 73/587; 73/593; 340/682
[58] Field of Search ............... 73/659, 660, 801, 587, 73/593; 340/682

[56] References Cited

U.S. PATENT DOCUMENTS

| | | | |
|---|---|---|---|
| 4,007,630 | 2/1977 | Noda | 73/593 |
| 4,024,522 | 5/1977 | Clark et al. | 73/801 |
| 4,352,293 | 10/1982 | Kurihara et al. | 73/593 |
| 4,423,634 | 1/1984 | Audenard et al. | 73/801 |
| 4,493,042 | 1/1985 | Shima et al. | 73/593 |
| 4,535,629 | 8/1985 | Prine | 73/587 |
| 4,574,633 | 3/1986 | Ohnuki et al. | 73/587 |
| 4,682,248 | 7/1987 | Schwartz | 360/32 |
| 4,685,335 | 8/1987 | Sato et al. | 73/660 |
| 4,763,523 | 8/1988 | Womble et al. | 73/587 |

FOREIGN PATENT DOCUMENTS

| | | |
|---|---|---|
| 53-43588 | 4/1978 | Japan . |
| 57-38626 | 8/1982 | Japan . |
| 61-234353 | 10/1986 | Japan . |
| 0296265 | 12/1986 | Japan ........................... 73/587 |
| 1361465 | 12/1987 | U.S.S.R. ........................... 73/593 |

OTHER PUBLICATIONS

Progress in Acoustic Emission IV, Proceedings of 9th Int'l Acoustic Emission Symposium.
"Abnormality Detection of Bearing by Sound Development of AE System for Diagnosis", article from the Nikkan Kogyo.
"Apparatus Which Detects Abnormality by Sound" from the Nikkei Sangyo.
"Abnormality Detection with Acoustic Sound New Weapon for Bearing Diagnosis Development in Cooperation with Kawasaki Steel Corporation" from the Nihon Kogyo.
Acoustic Mission, American Society for Testing and Materials.
E. Volker et al., "Early Detection of Damage in Rolling Bearings", 73/593, ISA Transactions, vol. 23, No. 3, pp. 27–32, 1984.

Primary Examiner—Hezron E. Williams
Assistant Examiner—Rose M. Finley
Attorney, Agent, or Firm—Wenderoth, Lind & Ponack

[57] ABSTRACT

Method for predicting destruction of a rolling bearing using an apparatus which has a sensor for detecting acoustic emission signals from a rolling bearing, a plurality of band-pass filters which have different specific frequency pass bands within the range of 150–400 KHz, first comparators for comparing outputs from the band-pass filters with their respective reference values for the specific frequency bands, time-measuring devices for measuring time during which the outputs from the band-pass filters exceed the reference values, and second comparators for comparing the time measured with a further reference value. Of all signals detected by the sensor, only those that have frequencies of 150–400 KHz pass the corresponding band-pass filters, and then are compared with their respective reference values. The first comparators signal to the time-measuring devices when the outputs from the band-pass filters exceed the reference values. Time during which each of the first comparators continues to signal is measured by the time-measuring devices and the time measured is compared with the further reference value by the second comparators. Based on comparison results by the second comparators, destruction of the rolling bearing is judged.

6 Claims, 4 Drawing Sheets

METHOD AND APPARATUS FOR PREDICTING DESTRUCTION OF A ROLLING BEARING

This is a continuation-in-part application of application Ser. No. 07/323,787, filed Mar. 15, 1989 now abandoned, which was a continuation-in-part application Ser. No. 07/184,615, filed Apr. 21, 1988 now abandoned.

BACKGROUND OF THE INVENTION

This invention relates to a method and apparatus for predicting destruction of a rolling bearing utilizing an acoustic emission (hereinafter referred to as AE).

For detecting the abnormal condition of a sliding bearing by utilizing AE, there has hitherto been known a method in which such abnormality is detected by an AE signal issuing from a metal surface damage caused by contact between a sleeve and a bush as a consequence of the lack of an oil film. On the other hand, in case of a rolling bearing, it has been known to detect the abnormal condition of the bearing or anticipate such possible abnormality as flaking or the like by AE signals of all frequencies or an AE signal within a frequency range of up to several 100 KHz.

However, with the known method for detecting the abnormal condition of a sliding bearing, a trouble is that since an AE from a metal surface damage is detected, it is impossible to foresee any possible damage. With the known method for anticipating the abnormality of a rolling bearing, it is difficult to make accurate anticipation with relation to abnormality such as flaking and the like, on the basis of the condition of the bearing, because AE signals of a wide frequency range are detected and no detection is made of any AE signal of such frequency range as is peculiar to damage indication. Where such abnormality as flaking or the like is anticipated by all frequency AE signals issuing from the rolling bearing according to the known method, this anticipation is not accurate and another difficulty is that critical limit determination has to be made when the operation time of the bearing has reached a level of 40-80% of possible flaking time.

SUMMARY OF THE INVENTION

Therefore, the object of the invention is to provide a method and apparatus for predicting destruction of a rolling bearing so as to predict a residual service life of rolling bearings at a high degree of accuracy by detecting an AE signal within a specific frequency band which will develop as a sign of possible flaking of the rolling bearings.

The present inventors have found that AE signals with a spectrum having a large power value can be detected, within a frequency range of 150-400 kHz, from a rolling bearing having a inner crack or a white layer, as a preliminary indication of flaking caused thereto, as shown in FIG. 2. Referring to FIG. 3, it has been also found that, of the AE signals from the rolling bearing, those of a specific frequency band (250-260 kHz, for example) within the frequency range of 150-400 kHz have a remarkably large power value in case of the operation time of the bearing being 70% or more of flaking time involved, as compared with case where the former is less than 70% of the latter. It has been further discovered that, of the AE signals within said frequency range of 150-400 kHz, those of other than specific frequency band, of 310-320 kHz, for example, do not show any noticeable change in power even if the bearing is operated to flaking, as shown in FIG. 4. In addition, it has been found that said specific frequency band may vary according to the condition of inner crack or white layer development.

A method for predicting destruction of a rolling bearing of the present invention, made on the basis of the above discoveries, comprises the following steps:

(a) detecting an acoustic emission from a rolling bearing by a sensor;

(b) causing outputs from the sensor to pass through a plurality of band-pass filters which have specific frequency bands different from each other within a range of 150-400 kHz;

(c) comparing the outputs having passed through the band-pass filters with corresponding predetermined reference values for the specific frequency bands respectively;

(d) measuring time during which the output from each of the band-pass filters continues to exceed the corresponding predetermined reference value;

(e) comparing the time measured with a further predetermined reference value which indicates a specific duration; and (f) judging that there have occurred phenomena indicating destruction of the bearing such as inner cracks and white layer development when the time measured about the output from at least one of the band-pass filters is longer than the specific duration.

According to the method of the invention, preliminary indication of flaking or exfoliation of a rolling bearing such as inner cracks and a white layer can be detected precisely not only by comparing the outputs passing through the band pass filters with respective reference values but also by comparing the time during which each of the outputs continues to exceed the reference value with a further reference value indicating a specific duration.

The reference values used at the above step (c) are determined in the following manner.

An average of powers of AE signals emitted from a rolling bearing and belonging to a specific pass band is calculated when the rolling bearing has reached a 10% level of its calculated life. A value which is about 10% larger than the average is set as a reference value for the specific pass band. Reference values for the other specific pass bands are determined similarly. Therefore, the reference value for one specific pass band is different from that for another specific pass band.

On the other hand, an apparatus for predicting destruction of a rolling bearing of the present invention, made on the basis of the aforementioned discoveries, comprises a sensor for detecting an acoustic emission from a bearing, as a preliminary indication of flaking, which has a specified frequency component within range of 150-400 KHz; a plurality of band-pass filters for passing therethrough the outputs of the sensor in different specific frequency pass bands within the range of 150-400 KHz; first comparing means for comparing outputs of the band-pass filters with predetermined reference values for the specific frequency bands respectively and signalling when any output exceeds the corresponding reference value; time-measuring means for measuring time during which each of the outputs from the first comparing means exceeds the corresponding reference value; and second comparing means for comparing each of times measured by the time-measuring means with a further predetermined reference value indicating a specific duration and signalling when at least one of the times measured exceeds the reference value, whereby a residual life of the rolling bearing is anticipated on the basis of the output of the second comparing means.

An apparatus with the above structure according to the present invention functions as follows.

An AE from a rolling bearing is detected by the sensor, and the output from the sensor is input to the plurality of band-pass filters. Of the outputs from the sensor, only those of different specific frequency bands within the frequency range of 150 KHz–400 KHz are allowed to pass through said plurality of band-pass filters, being then input to the first comparing means. In the first comparing means, the outputs of the specific frequency bands are compared with their respective reference values. When an output exceeds its own reference value, the first comparing means signal to the time-measuring means. The time-measuring means start measuring time in response to the signal of the first comparing means. The second comparing means compare the time measured by the time-measuring means with the reference value; and on the basis of the output of the second comparing means, the residual service life of the rolling bearing is predicted.

The apparatus of the above construction can detect a condition of a rolling bearing at the time when the operation time of the rolling bearing has reached a 70% to 90% level of the flaking time, or the condition of inner crack or white layer development as a preliminary indication of flaking, as described later, so that the residual service life of the bearing can be predicted very accurately.

Furthermore, the fact that the apparatus for predicting destruction of a rolling bearing has a plurality of band-pass filters for passing therethrough only AE signals of specific frequency bands within the 150 KHz–400 KHz frequency range of all signals from the rolling bearing provides an advantage that the effect of any possible noise or the like disturbing factor can be minimized, and makes it possible to accurately cope with variation in power of AE signals in the specific frequency zone due to any inner crack or white layer development.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
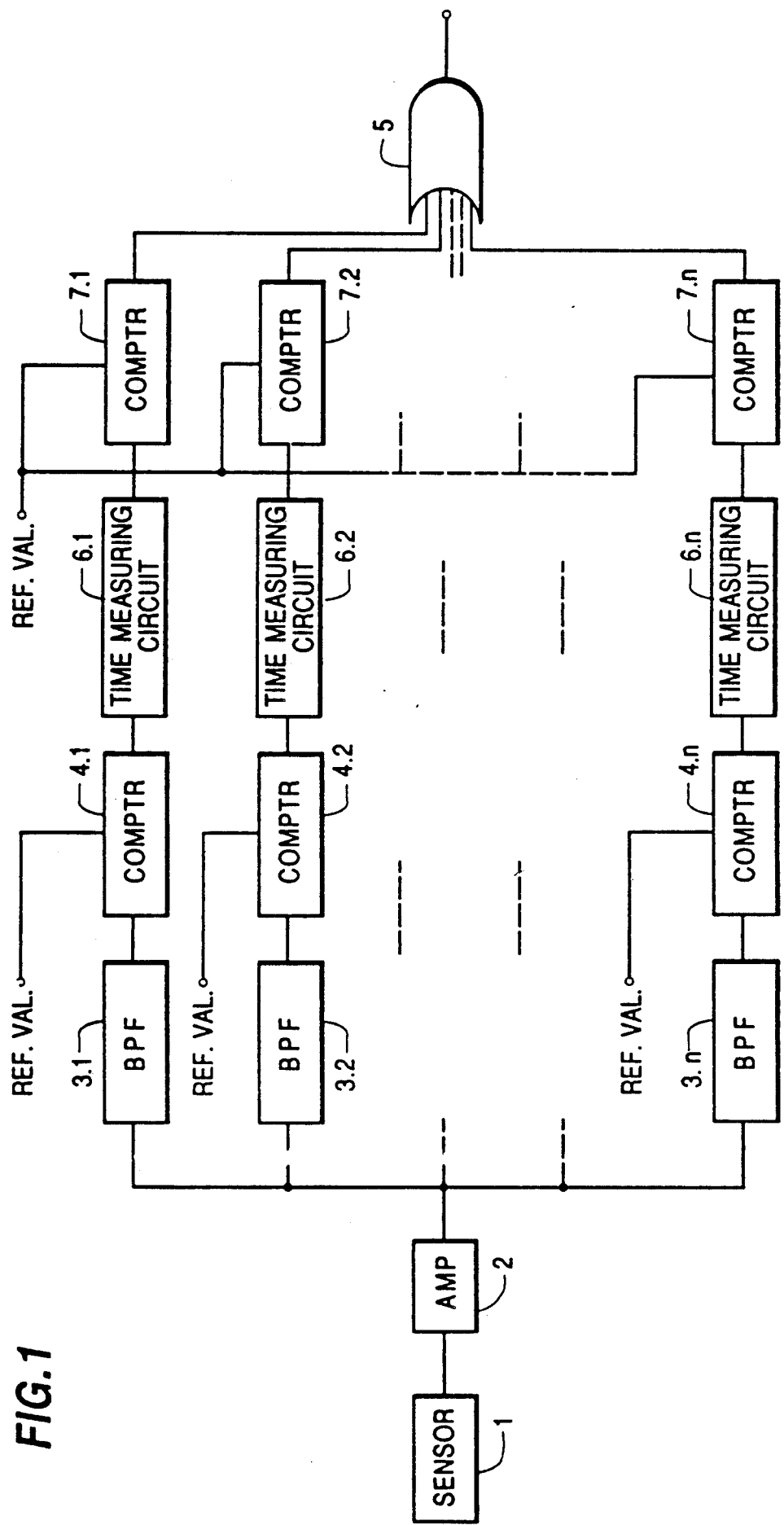
FIG. 1 is a block diagram showing a circuit arrangement of one embodiment of the apparatus for predicting destruction of a rolling bearing according to the invention.

In FIG. 1, numeral 1 designates a sensor mounted to a rolling bearing for detecting series of AE from the rolling bearing; 2 designates an amplifier for amplifying AE signals from the sensor 1; 3.1, 3.2, ..., 3.n designate band-pass filters for passing therethrough only AE signals of specific frequencies within the range of 150–400 KHz, each pass band width of which band-pass filters is between 5 KHz and 20 KHz, 10 KHz, for example; 4.1, 4.2, ..., 4.n denote first comparators for comparing outputs from the band-pass filters 3.1, 3.2, ..., 3.n with their respective reference values and outputting "excess" signals if the outputs of the band-pass filters exceed the reference values respectively; 6.1, 6.2, ..., 6.n denote time measuring circuits for measuring time during which the first comparators 4.1, 4.2, ..., 4.n continue to output the "excess" signals, output from each of the time measuring circuits 6.1, 6.2, ..., 6.n indicates a value obtained by integrating the input with respect to the time; 7.1, 7.2, ..., 7.n denote second comparators each of which compares the output from the corresponding time measuring circuit with a further reference value and outputs an "excess" signal when the output from the time measuring circuit exceeds the reference value; and 5 denotes an OR circuit for issuing an alarm in response to output from any one of the second comparators 7.1, 7.2, ..., 7.n.

With the foregoing arrangement, an AE signal detected by the sensor 1 is input to the band-pass filters 3.1, 3.2, ..., 3.n. The band-pass filters allow only those AE signals that are in different frequency bands within the range of 150–400 KHz, the width of the frequency bands being 5 KHz to 20 KHz, 10 KHz for example, to pass therethrough for being input to the first comparators 4.1, 4.2, ..., 4.n. In oné first comparator 4.1, for example, the power of each input AE signal is compared with a corresponding reference value. When the AE signal exceeds the reference value, the first comparator 4.1 outputs the "excess" signal to the time measuring circuit 6.1. The time measuring circuit 6.1 measures the input or "excess signal" with respect to the time during which the time measuring circuit 6.1 continues to receive the "excess" signal from the first comparator 4.1, and value obtained through the time measurement is outputted to the second comparator 7.1. The second comparator 7.1 then compares the value received from the time measuring circuit 6.1 with the reference value and when the value exceeds the reference value, the second comparator 7.1 outputs the "excess" signal to the OR circuit 5. The OR circuit 5 issues an alarm when it receives the "excess" signal from any one of the second comparators 7.1, 7.2, ..., 7.n.

Figure 2:
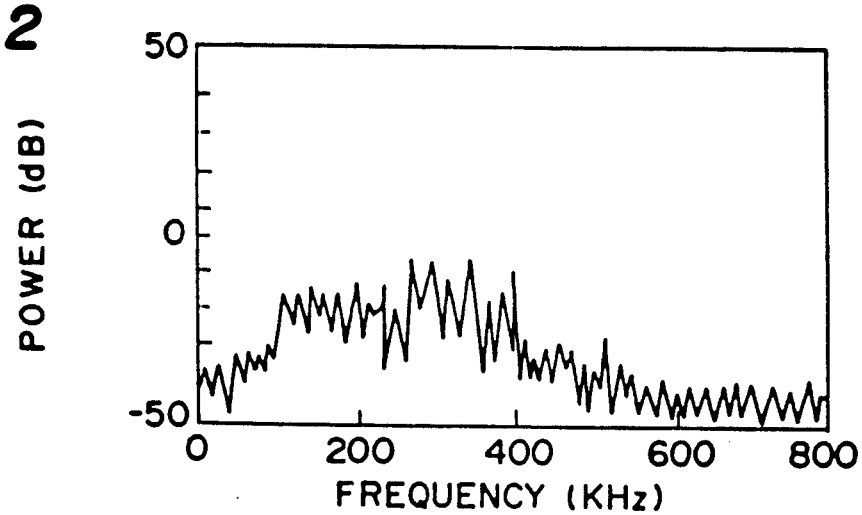
FIG. 2 is a graph showing spectra of AE signals from a rolling bearing having a inner crack or a white layer caused thereto as a sign of possible flaking.
Figure 3:
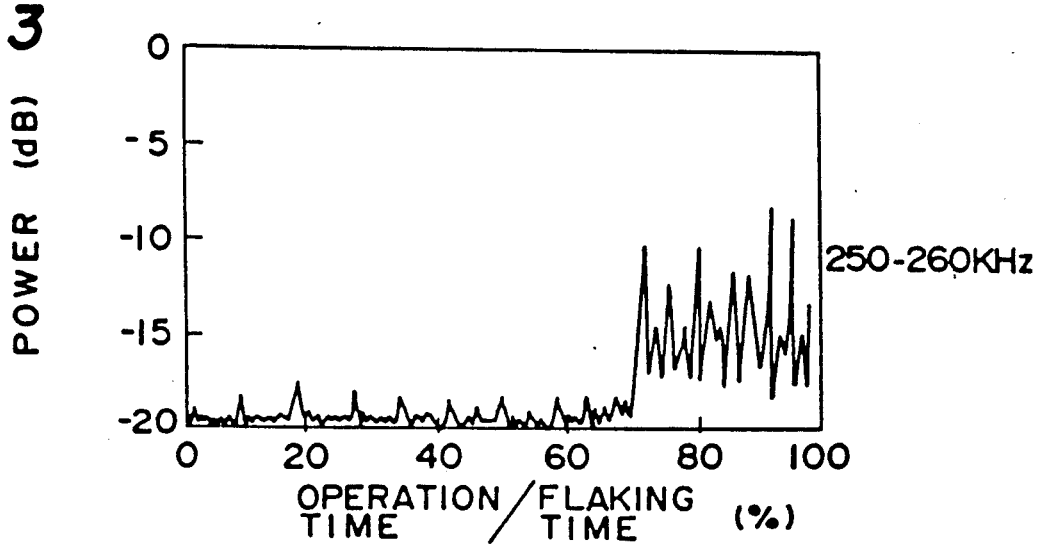
FIG. 3 is a graph showing a relation between power of AE signals of a frequency band of 250–260 kHz within range of 150 KHz–400 KHz, of all the AE signals from a rolling bearing, and operation time of the bearing.
Figure 4:
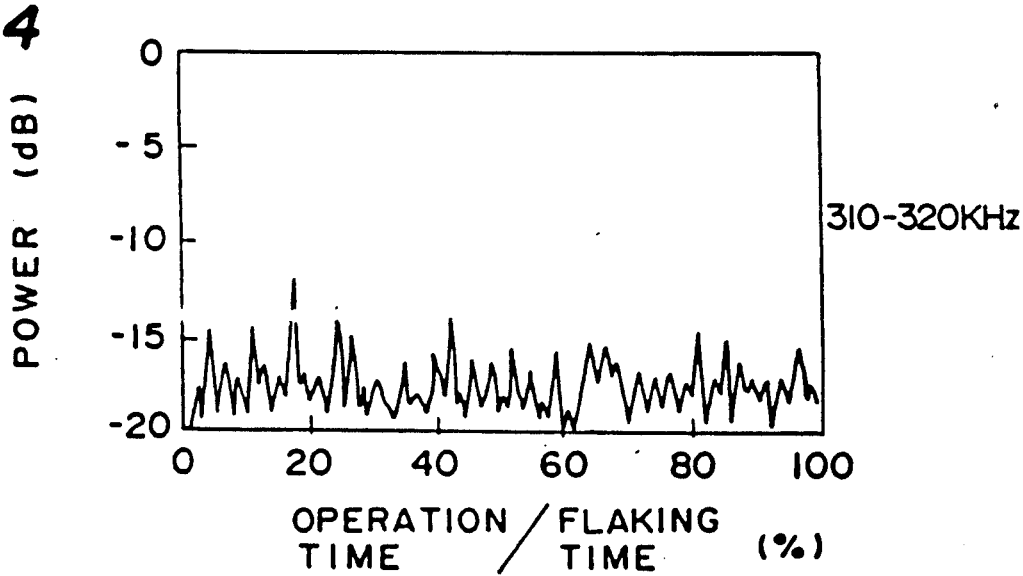
FIG. 4 is a graph showing a relation between power of AE signals of another frequency band of 310–320 kHz within the 150 KHz–400 KHz range and operation time of the bearing.

In this way, power of those AE signals which are in a specific frequency band of a 5 to 20 KHz band width within the frequency range of 150 KHz–400 KHz, of all AE signals emitted from the bearing, are compared with the reference values, and in addition, the value related to the time during which the AE signals exceeding the reference values are emitted continuously is compared with the further reference value; thus, as shown in FIG. 2, the condition of the bearing at the time when the operation time has reached a stage of 70% to 90% of flaking time, that is, the condition of inner crack or white layer development as a preliminary indication of the flaking can be detected without failure. In other words, it can be judged that a residual life of the rolling bearing after an initial point at which the output from at least one of the band-pass filters starts exceeding the reference value is not more than three-sevenths of a working time of the rolling bearing prior to the initial point.

Further, the use of the plurality of band-pass filters permits accurate detection of AE signals in said specific frequency band, the effect of any noise being thus alleviated.

In the above-described embodiment, the OR circuit issues an alarm when it receives a signal from any one of the second comparators 7.1, 7.2, ..., 7.n, but alternatively an AND circuit may be employed in place of the OR circuit so that an alarm can be issued when the AND circuit receives signals from all the second comparators.

Furthermore, it is noted that though in the above-described embodiment the first and second comparing means consist of comparators of the analog circuit type, a microcomputer software arrangement may be employed in place thereof.

The time measuring circuits 6.1, 6.2, ..., 6.n are for measuring the time during which the output from a band-pass filter continues to exceed a predetermined value, i.e. from the time when output from the band-pass filter exceeds the predetermined value to the time when the output from the filter falls below the predetermined value.

Figure 6:
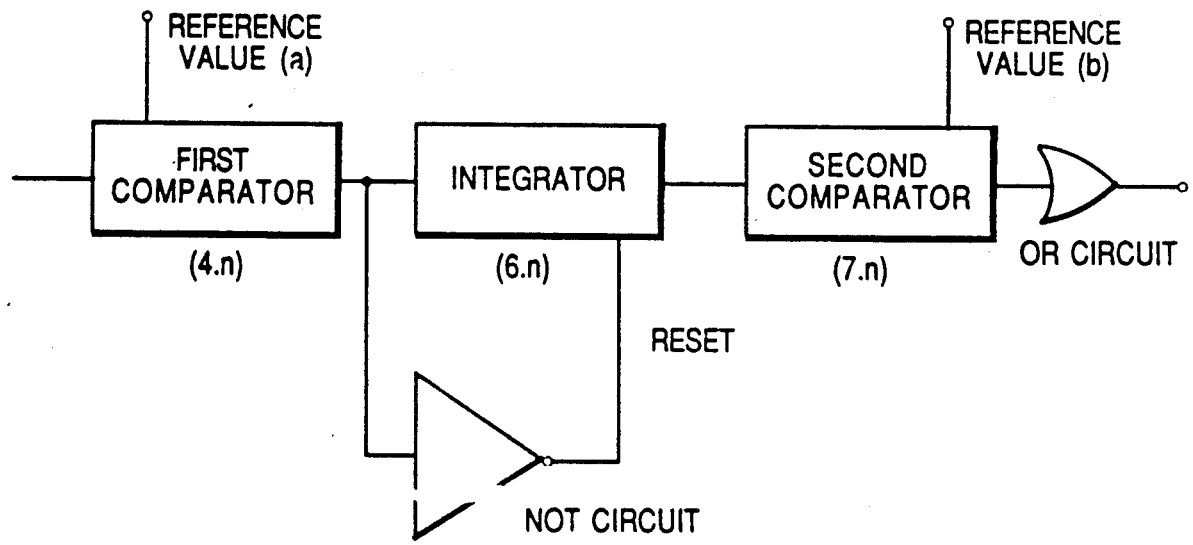
FIGS. 6, 7 and 8 depict various embodiments of the time measuring circuit 6.1, 6.2, ..., 6.n shown in FIG. 1.
Figure 7:
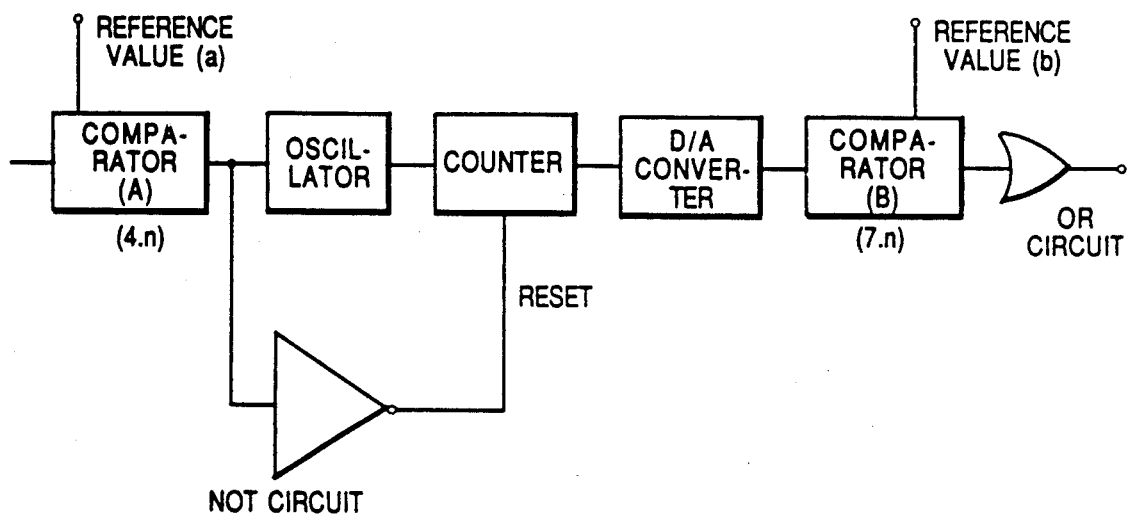
Figure 8:
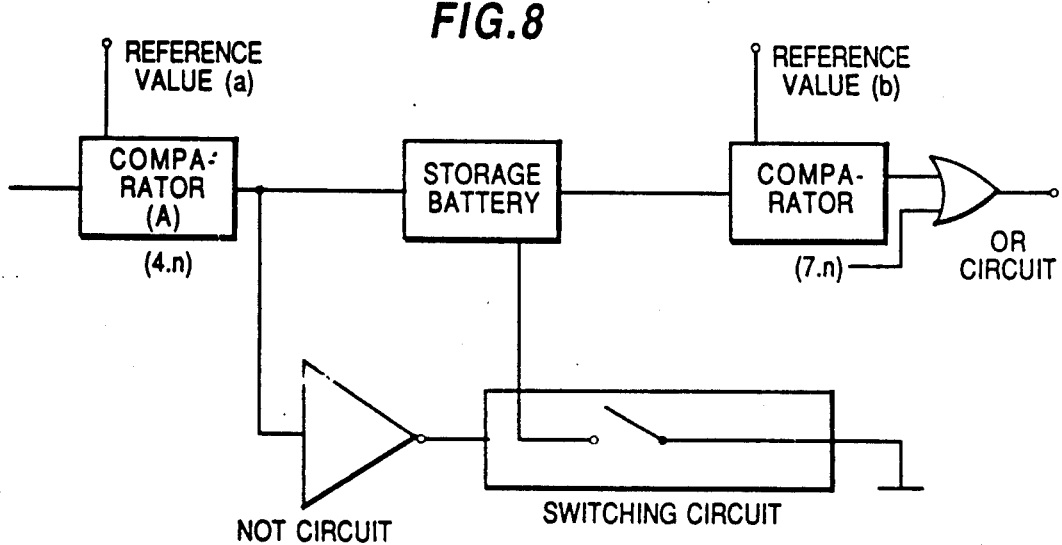

Three embodiments of the time measuring circuits 6.1, 6.2, ..., 6.n are disclosed herein with reference to FIGS. 6, 7 and 8.

As shown in FIG. 6, integrator circuits can be utilized as the time measuring means.

Figure 5:
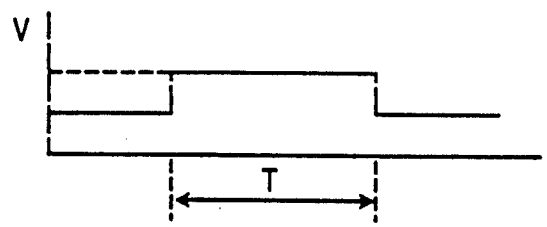
FIG. 5 depicts the output of the comparator circuits 4.1, 4.2 ... 4.n shown in FIG. 1.

The output from the comparator (4.n) is a pulse having a constant voltage. The integration of the pulse is simply a multiplication of V (voltage of a constant value) by T (time) as shown in FIG. 5.

Since V is a constant value, the integral is a function of time (T). Accordingly, the time during which the output from the band-pass filter continues to exceed a predetermined value can be obtained through the integration of the pulse from the comparator (4.n). The output from the integrator circuit (6.n) is therefore substantially proportional to the time T.

The integrator circuits are combined with a NOT circuit (inverter) as shown to reset the integrator circuit when the output from the band-pass filter falls below the reference value (a).

Another embodiment of the time measuring circuits 6.1, 6.2, ..., 6.n is shown in FIG. 7.

In this embodiment, power of an AE signal is compared with a predetermined reference value by a comparator (A). The comparator (A) outputs a signal when the power exceeds the reference value (a). An oscillator, when receiving the output from the comparator (A), starts oscillating, and at the same time, a counter starts counting the number of oscillations. When there is no output from the comparator (A), namely, when the power falls below the reference value (a), the counter is reset by a NOT circuit.

The output from the counter indicating the number of oscillations in digital form is converted to an analog form by a D/A converter and then compared with another reference value (b) by a comparator (B). When output from the D/A convertor exceeds the reference value, namely, when the power continues to exceed the reference value (a) for a given time, the comparator (B) outputs a signal to an OR circuit.

Yet another embodiment of the time measuring circuit 6.1, 6.2, ..., 6.n is shown in FIG. 8.

Also in this embodiment, power of an AE signal is compared with a predetermined reference value (a) by a comparator (A). The comparator (A) outputs a signal of a constant voltage when the power exceeds the reference value (a).

The output from the comparator (A) is accumulated in a storage battery. The voltage of the battery is compared with a further reference value (b) by a comparator (B). When the voltage exceeds the reference value (b), namely, when the power continues to exceed the reference value (a) for a given time, the comparator (B) outputs a signal to an OR circuit.

When the output from the comparator (A) becomes lower than the reference value (a), electricity stored in the battery is discharged to the earth by a NOT circuit and a switching circuit as shown.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Method for predicting destruction of a rolling bearing, comprising steps of:
    detecting an acoustic emission from a rolling bearing by a sensor;
    causing outputs from the sensor to pass through a plurality of band-pass filters which have specific frequency pass bands different from each other within a range of 150–400 kHz;
    comparing the outputs having passed through the band-pass filters with corresponding predetermined reference values for the specific frequency bands respectively;
    measuring time during which the output from each of the band-pass filters continues to exceed the corresponding reference value;
    comparing the time measured with a further predetermined reference value which indicates a specific duration; and
    judging that there have occurred phenomena indicating destruction of the bearing such as inner cracks and white layer development when the time measured about the output from at least one of the band-pass filters is longer than the specific duration.

2. Method for predicting destruction of a rolling bearing as claimed in claim 1, further comprising a step of:
    judging that a residual life of the rolling bearing after an initial point at which the output from the at least one of the band-pass filters starts exceeding the reference value is not more than three-sevenths of a working time of the rolling bearing prior to the initial point.

3. An apparatus for predicting destruction of a rolling bearing comprising:
    a sensor for detecting an acoustic emission from a bearing, as a preliminary indication of flaking, which has a specified frequency component within a range of 150-400 KHz;

a plurality of band-pass filters for passing therethrough the outputs of the sensor in different specific frequency pass bands within the range of 150-400 KHz;

first comparing means for comparing outputs of the band-pass filters with predetermined reference values for the specific frequency bands respectively and signalling when any output exceeds the corresponding reference value;

time-measuring means for measuring time during which each of the outputs from the first comparing means exceeds the corresponding reference value; and second comparing means for comparing each of times measured by the time-measuring means with a further predetermined reference value indicating a specific duration and signalling when the time measured exceeds the reference value, whereby a residual life of the rolling bearing is predicted on the basis of the output of the second comparing means.

4. An apparatus as recited in claim 3, said time-measuring means comprising:

a plurality of integrator circuits having inputs respectively coupled to said first comparing means and having outputs respectively coupled to said second comparing means, and, a plurality of reset means, respectively coupled to said first comparing means and to said plurality of integrator circuits, for resetting said plurality of integrator circuits in accordance with an output of said first comparing means.

5. An apparatus as recited in claim 3, said time measuring means comprising:

a plurality of oscillators having inputs respectively coupled to said first comparing means;

a plurality of counters having inputs respectively coupled to outputs of said plurality of oscillators;

a plurality of digital-to-analog converters having inputs respectively coupled to outputs of said plurality of counters and having outputs respectively coupled to said second comparing means; and a plurality of reset means, respectively coupled to said first comparing means and to said plurality of counters, for resetting said plurality of counters in accordance with an output of said first comparing means.

6. An apparatus as recited in claim 3, said time measuring means comprising:

a plurality of storage battery means, having inputs respectively coupled to said first comparing means and having outputs respectively coupled to said second comparing means, for continuously increasing an output voltage thereof in response to a voltage applied thereto by said first comparing means;

a plurality of reset means, respectively coupled to said first comparing means and to said plurality of storage battery means, for resetting said plurality of storage battery means in accordance with an output of said first comparing means.

* * * * *